Oct. 6, 1953  J. SPERLING  2,654,339
INDICATOR FOR WORKING POSITION OF AGRICULTURAL TOOLS
Filed Dec. 19, 1949

Inventor.
John Sperling
By Egerton R. Case
Patent Agent.

Patented Oct. 6, 1953

2,654,339

UNITED STATES PATENT OFFICE 2,654,339

INDICATOR FOR WORKING POSITION OF AGRICULTURAL TOOLS

John Sperling, Dalmeny, Saskatchewan, Canada

Application December 19, 1949, Serial No. 133,727

2 Claims. (Cl. 116—124)

This invention relates to means to indicate the working positions of agricultural tools, and, in the broadest possible terms, the object of the invention is to utilize the manually-effected vertical movement of said tools with relation to a given zone of operation thereof, in the soil, to effect a movement in some suitable indicator carried by the implement to visually show to the operator that the functioning edge of the tool, normally out of the sight of the operator, and moved out of its given zone of operation owing to softness or hardness of the soil, has been ultimately restored to said zone of operation.

This invention is adapted to be used on an agricultural implement of well-known make, known as a roto-lift one-way disc. The discs are in gangs and are supported by hangers rigidly carried by a sleeve rotatable on an axle suitably carried by the implement. The hangers are only movable collectively on this axle at the will of the operator to raise and lower the discs.

As the implement passes over the ground it, as a whole, rises and falls according to the state of the soil. The result is that the furrow made by the discs varies in depth, a condition for seeding not at all desirable.

Heretofore no means has been provided whereby the operator can largely accurately control the uniform depth of the furrow notwithstanding the character or state of the soil. This invention will enable the operator, while on his seat, to cut furrows very largely of uniform depth.

To effectively use this invention the farmer is required to use a certain amount of judgment, based upon his knowledge of the condition or state of the soil he is seeding, to maintain the discs at work in the desired zone.

In the following specification will be described the preferred embodiment of this invention.

In the drawings like characters of reference refer to the same parts.

Figures 1, 2:
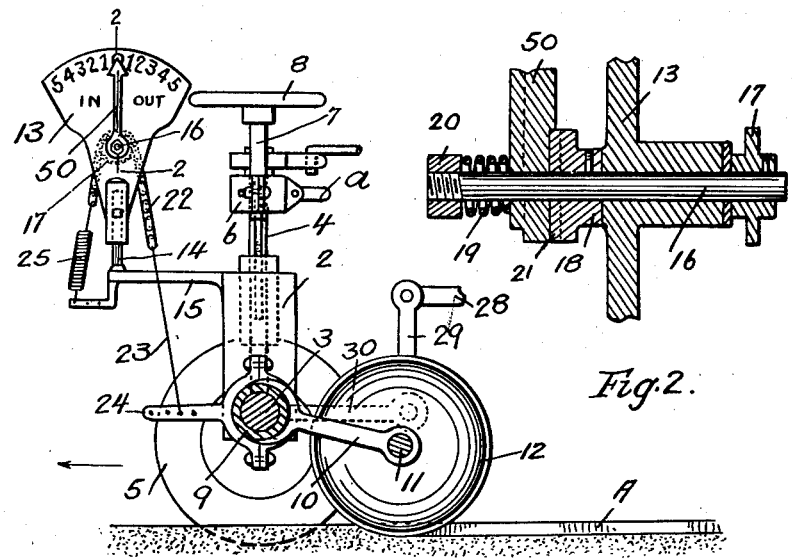
Fig. 1 is a cross section of a disc-provided seeder of a well-known form (without the seed box) provided with a suitable form of this invention.
Fig. 2 is a vertical section on the line 2—2, Fig. 1.
Figure 3:
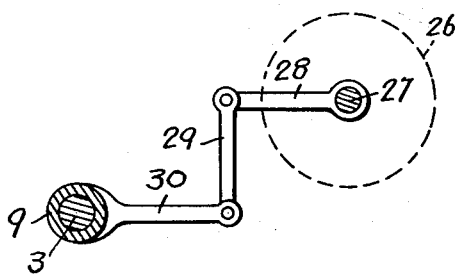
Fig. 3 is a sectional detail showing the lever means for manually raising and lowering the discs.

In the embodiment of the invention shown portion of a well-known one-way disc-harrow is shown comprising a gang of discs 12 rotatably supported on the axle 11. This axle is rigidly coupled by hangers 10 to a sleeve 9 free to turn on the axle 3 suitably supported by standards forming part of the frame of the implement. Only one of such standards 2 is shown. The frame of the implement (not fully shown) is supported by three wheels, one adjacent each of the standards 2, such as the wheel 5. The third wheel (not shown) is carried by the frame of the implement in the usual manner.

Each wheel 5 is supported by a vertical post 4 rotatably supported in a standard 2. Carried by each post 4 is a collar 6, braced in the usual manner, from a standard 2. Rotatably held in each collar 6, and threaded into each standard 2, is a rod 7 which carries a wheel 8. By rotating each wheel 8 the whole of the implement is raised or lowered at each end to make it parallel with the ground. Any well-known means such as a latch $a$ is used to lock the standards 2 and hence the whole of the implement, in adjusted position. These elements and the action thereof are well known in the art.

Before the farmer starts to seed he adjusts the horizontal position of the implement, and the gang of discs is manually lowered into the ground, for example, four inches, the required depth to form the desired furrow. He then by hand moves the pointer 56 of this signal to 0 thus showing that the working edges of the discs are set to work in the ground at the desired depth. As the implement moves over the ground the gang of discs rises and falls. These vertical movements change the original working depth of the discs, and hence suitable means, as follows, is provided to enable the operator to largely control the depth at which the discs work.

A hand wheel 26, convenient to the seated operator, is mounted on a rod 27, suitably supported by the frame of the implement. Keyed on the rod 27 is an arm 28 which is coupled by a link 29 to an arm 30 firmly coupled to the sleeve 9. By means of the elements just described the operator is enabled to vertically raise and lower the gang of discs 12 independently of the rise and fall of the rest of the implement. When the implement is passing, say, over soft soil, it sinks as a whole, thus carrying the gang of discs downward deeper into the soil. To sufficiently raise this gang of discs the operator will turn the wheel 26 sufficiently to the right. This movement of the wheel will, through the arms 28 and 30 and the link 29, move the sleeve 9 circumferentially on the axle 3, and hence the hangers 10 upwardly thus raising up the discs 12. The distance these discs are raised will be visually indicated on the plate 13 through the following suitable means. As the sleeve 9 is moved the arm 24 coupled thereto will be moved downward, thus it will, through the cable 23, and sprocket chain 22 and sprocket wheel 17 mounted on the axle 16, which latter is journalled in the plate 13, move the pointer 50 keyed on the axle 16, to the right of 0 in the "out" zone far enough to show to the operator of the implement how far the discs 12 have been raised up. When the implement has passed over the soft soil the operator turns the wheel 26 in the opposite direction, and by means of the elements just described connected therewith and the spring 25 coupling the sprocket chain 22, over the sprocket wheel 17, to the cable 23, returns the pointer 50 to its original position shown in Fig. 1, thus showing the operator that the discs 12 are again operating at the original depth.

When the implement is passing over harder soil it will rise up as a whole thus raising up the gang of discs to operate above the desired depth. Under such circumstances the operator will turn the wheel 26 in the direction opposite to that first mentioned. This movement of said wheel will result in the depression of the arm 30 thus turning the sleeve 9 with the result that the hangers 10 will lower the discs 12, and the arm 24 will be raised thus permitting the spring 25, coupling the sprocket chain 22, to the arm 15, in coaction with the sprocket wheel 17, to move the pointer 50 to the left of 0 in the "in" zone. When the implement passes onto softer soil the operator will move the wheel 26 in the opposite direction to that last mentioned and restore the pointer 50 to the position shown in Fig. 1, thus visually showing that the discs are working again at the original depth.

It will be apparent that the gang of discs is manually moved solely to control the depth at which the discs work.

The post 14, carried by the arm 15, supports the plate 13.

The numerals 1 to 5 in the "in" and "out" zones individually indicate that the edges of the discs are below or out of their working zone varying distances when the pointer 50 may point to any one thereof.

Figure 4:
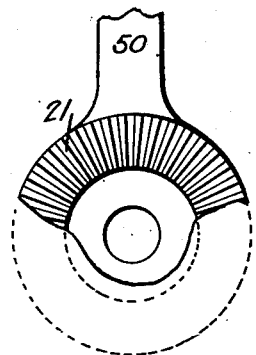
Fig. 4 is a detail showing the rack on the pointer.

Obviously the pointer 50 must be manually movable apart from any movement given thereto by the arm 24 so that it may be set at 0. To permit of this the hub of the pointer is provided with a rack 21 (Fig. 4) and this rack is held by the spring 19 and nut 20 on the axle 16 yieldingly in contact with a like rack on the collar 18 which is keyed to the axle. This construction permits the farmer when starting operations to manually move the pointer 50 to point to 0 or any other character on the plate 13.

The plate 13 and the markings thereon constitute a non-automatic indicator.

The principle of the invention can also be applied to all types of mowing machines using a horizontal cutter-bar where it is desired to maintain the active cutter-bar in a given plane of activity above the surface of the ground, and in certain implements for handling mowed crops.

I claim:

1. In an agricultural implement in combination a frame mounted on ground wheels; agricultural tools to function a given distance above or below the surface of the soil; means whereby said tools are coupled to said frame to normally rise and fall therewith according to the state of the soil said implement is passing over; releasable lever means carried by said frame and firmly coupled to the coupling means for said tools and under the manual control of the driver of the implement whereby said tools may be definitely raised and lowered on said first-mentioned means independently of any vertical movements of said frame; an indicator carried by said frame to rise and fall therewith without functioning, comprising a plate provided with suitable indicia to show what location said tools are working in; a movable pointer associated with said plate and manually set in relation to the indicia thereon to show in what location said tools have been set to initially work in, and spring-provided flexible means coupling said lever means to said pointer whereby as said tools are being manually moved to restore them to their initial working location after being moved therefrom by the rise or fall of said frame, said pointer will be simultaneously moved as said tools are so moved, to bring it back to its original position thereby indication that the tools have been restored to the desired working location.

2. In an agricultural implement in combination a frame; an axle mounted therein; ground wheels on said axle; a sleeve turnable on said axle; a plurality of ground-working tools; lever means coupling said tools to said sleeve; lever means firmly coupled to said sleeve and under manual control; a lever firmly coupled to said sleeve; an indicator carried by said frame comprising a plate provided with suitable indicia to show in what location said tools may be working; a movable pointer associated with said plate and manually set in relation to the indicia thereon to show in what location said tools have been set to initially work in, and a spring-provided drive belt between said last-mentioned lever and said pointer whereby as said tools are being moved through said manually-controlled lever means to restore them to their initial working position after having been moved therefrom by the rise or fall of said frame, said pointer will be simultaneously moved by said drive belt as said tools are moved, to bring it back to its original position thereby indicating that the tools have been restored to the desired working position.

JOHN SPERLING.

References Cited in the file of this patent

UNITED STATES PATENTS

| Number | Name | Date |
|--------|------|------|
| 495,047 | Knowles | Apr. 11, 1893 |
| 900,427 | Rush | Oct. 6, 1908 |
| 2,023,053 | Kugel | Dec. 3, 1935 |
| 2,321,605 | Keinath | June 15, 1943 |

FOREIGN PATENTS

| Number | Country | Date |
|--------|---------|------|
| 818,408 | France | June 14, 1937 |